United States Patent [19]

Calcutt

[11] 4,428,651

[45] Jan. 31, 1984

[54] CLICK-STOP FOCUSING OF BINOCULARS

[75] Inventor: Wilfred Calcutt, Doncaster, England

[73] Assignee: Swift Instruments, Inc., Boston, Mass.

[21] Appl. No.: 331,480

[22] Filed: Dec. 17, 1981

[51] Int. Cl.³ .............................................. G02B 7/06
[52] U.S. Cl. ..................................... 350/556; 350/563
[58] Field of Search ............................... 350/518–522, 350/537, 545–556, 563–566, 254–255, 429–430

[56] References Cited

U.S. PATENT DOCUMENTS

| | | | |
|---|---|---|---|
| 975,672 | 11/1910 | Bausch | 350/255 |
| 1,229,117 | 6/1917 | Mihalyi | 350/255 |
| 3,138,082 | 6/1964 | Schrumpf | 354/204 |
| 3,266,367 | 8/1966 | Dowling et al. | 350/555 |
| 3,913,113 | 10/1975 | Yamashita | 354/195 |
| 4,110,005 | 8/1978 | Bohm et al. | 350/430 |

FOREIGN PATENT DOCUMENTS

| | | | |
|---|---|---|---|
| 409245 | 4/1934 | United Kingdom | 350/521 |
| 536799 | 5/1941 | United Kingdom | 350/255 |

*Primary Examiner*—William H. Punter
*Attorney, Agent, or Firm*—W. R. Hulbert

[57] ABSTRACT

In binoculars including focusing means comprising an adjustable, rotatable focusing knob operatively associated with focus adjustment means, whereby rotation of the knob adjusts the focus adjustment means in a manner related to the distance between a viewer employing said binoculars and an object to be viewed, the improvement comprising first click-stop means operatively associated with the rotatable focusing knob, the click-stop means being effective to abruptly increase the force required to rotate the knob at a focus setting for a predetermined distance between the object to be viewed and the viewer.

1 Claim, 3 Drawing Figures

CLICK-STOP FOCUSING OF BINOCULARS

BACKGROUND OF THE INVENTION

This invention relates to binoculars.

Individual focus binoculars ordinarily employ focusing means, for each half, including an adjustable, rotatable focusing knob operatively associated with focus adjustment means whereby rotation of the knob adjusts the focus adjustment means in a manner related to the distance between a viewer employing the binoculars and an object to be viewed.

SUMMARY OF THE INVENTION

The preset invention provides an improvement in such binoculars, the improvement comprising click-stop means operatively associated with the rotatable focusing knob. The click-stop means is effective to abruptly increase the force required to rotate the knob, at a focus setting for a predetermined distance between the object to be viewed and the viewer.

In preferred embodiments, there is at least one additional click-stop means, set at a different focal setting. Preferably there are five or fewer settings, most preferably only two. The click-stop means is most preferably a spring and ball mechanism, the ball of which fits partway into a cylindrical recess of smaller diameter. External visual indications of the location of the click-stop mechanism are preferably provided. Preferably the knob and focus adjustment means together comprise a cam-activated focusing mechanism.

The binoculars of the invention allow the viewer to very quickly click the binoculars into a focal position which can be used to view objects a range of distances away. This is possible because, at a focal setting set for an object, say, 40 meters away, an object between about 25 and 60 meters away can be clearly seen, because of the natural tendency of the human eye to bring slightly out-of-focus objects into focus. If two settings are provided, a viewer can quickly and easily switch from a close to a near object, and back again, without moving the binoculars away from the eyes.

Other features and advantages of the invention are apparent from the following description of the preferred embodiment and the drawings thereof, and from the claims.

DESCRIPTION OF PREFERRED EMBODIMENT

Figure 1:
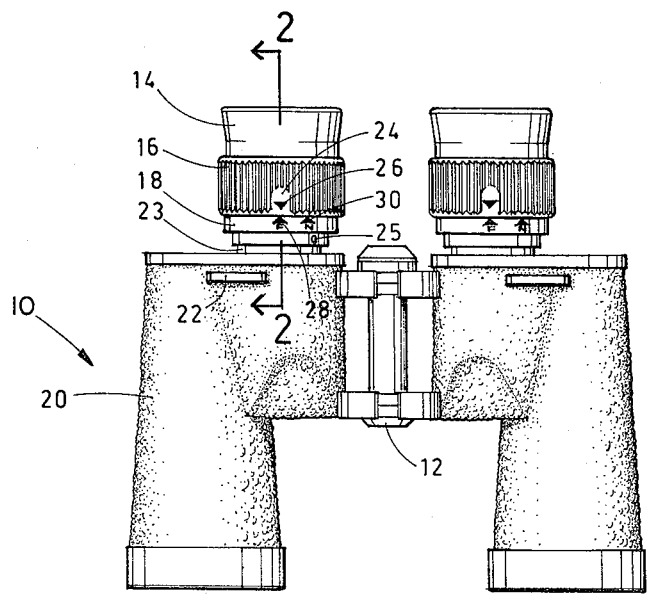
FIG. 1 is a side elevation of binoculars embodying the invention.

Referring to FIG. 1, the side of binoculars 10 shown is the side facing the ground when the binoculars are in use. The binoculars include two halves which contain the optics used in magnification, and the focus adjustment means, and which are joined together by hinge 12, which allows adjustment of the spacing apart of the eyepieces to accomodate viewers having eyes set different distances apart.

Referring to FIG. 1, lower barrel casings 20 are equipped internally with a pair of prisms (not shown), and externally with thumb rests 22, which contain rectangular holes (not shown) which allow the insertion of a cord for securing the binoculars around the neck of a user.

Figure 2:
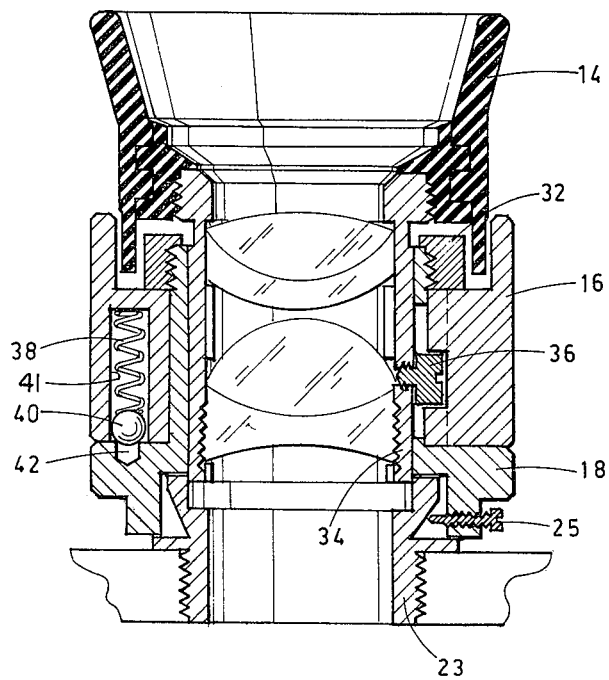
FIG. 2 is a sectional view of said binoculars taken at 2—2 of FIG. 1.
Figure 3:
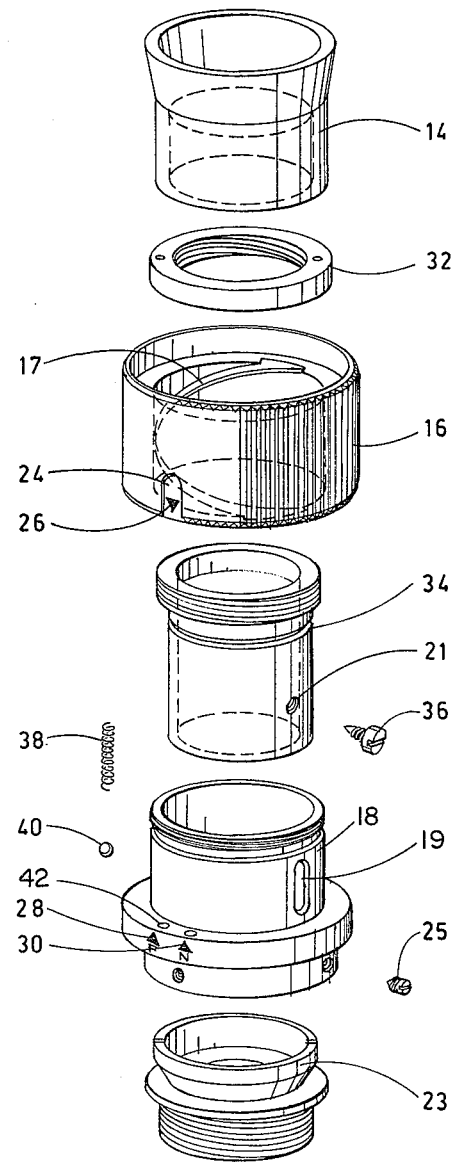
FIG. 3 is an exploded view of the portion of said binoculars shown in section in FIG. 2.

Referring to FIGS. 1–3, and especially to FIG. 3, each half of the binoculars features a cam-actuated focusing mechanism which is constructed as follows. Eyepiece adaptor 23 is screw-fitted into lower barrel casing 20. Outer eyepiece barrel 18 is fixed to eyepiece adaptor 23 by means of three set screws 25, one of which is shown in each of FIGS. 1–3. Outer eyepiece barrel 18 fits over inner eyepiece barrel 34 such that slot 19 and hole 21 are aligned to accept screw pin 36, which extends into inner groove 17 of knurled, rotatable focusing knob 16. Threaded locking ring 32 fixes knob 16 to outer eyepiece barrel 18. Rubber eyecup 14 is screwed into inner eyepiece barrel 34.

Knurled knob 16 includes an arch-shaped smooth portion 24 in which recessed, white-painted arrow 26 resides. The thickened portion of outer eyepiece barrel 18 contains two recessed arrows 28 and 30, one painted green and labelled "F" (for "far") and one painted red and labelled "N" (for "near"); these arrows are arranged so that their tips point toward the tip of the arrow on knurled knob 16.

The click-stop means includes a spiral spring 38 within each knurled knob 16, aligned with white arrow 26. Associated with one end of spring 38 is steel ball bearing 40. Spring 38 is movable within track 41 of knob 16.

Each outer eyepiece barrel 18 contains, aligned with the green and red arrows, countersunk cylindrical recesses 42 whose cross-sectional diameters are smaller than the diameter of ball bearing 40.

In operation, the distance between the viewer's eye and the lenses of the binoculars is adjusted by rotating knob 16, which causes movement of eyecups 14 by means of the movement of screw pin 36 in slot 19 and groove 17. Counterclockwise rotation extends eyecups 14 out from knob 16 and focuses on near objects, while clockwise rotation causes eyecups 14 to recede and focuses on objects which are farther away.

When knob 16 is rotated so that ball 40 falls partway into one of the two recesses 42, the force required to continue rotating knob 16 is abruptly increased, and knob 16 clicks to a stop.

At the click-stop setting corresponding to "N" arrow 28, the binoculars are set to focus on an object about 40 meters from the viewer. At the click-stop setting corresponding to "F" arrow 30, the binoculars are set to focus on an object about 250 meters from the viewer. However, because the human eye has an inherent tendency to bring a slightly out-of-focus image into focus, the two settings can be used to view objects in the range of 25–80 meters and 60–600 meters from the viewer, respectively. Thus, a viewer can quickly go from viewing a close object to viewing a far away object by simply rotating knobs 16 clockwise from the "N" click-stop to the "F" click-stop. This can be done without moving the binoculars away from the eyes, and can be done in a fraction of a second; the latter advantage is particularly useful when the binoculars are being used to observe a rapidly-occurring event such as a horse race. The binoculars are focused normally between or on either end of the click-stop positions.

Modifications and variations of the present invention are possible in light of the above teachings. Accordingly, it is to be understood, that within the scope of the appended claims, the invention may be practiced otherwise than as specifically described.

For example, the focus settings at which there are click-stops, and the number of click-stops, can be varied, depending on the use envisioned for the binoculars. Similarly, the invention is not limited to the spring-/ball/recess click-stop mechanism of the specific example, and can employ any suitable click-stop mechanism. Further, the click-stop mechanism can be employed with alternative focusing mechanisms, such as a conventional worm screw mechanism.

I claim:

1. In binoculars including focusing means comprising an adjustable, rotatable focusing knob operatively associated with focus adjustment means, whereby rotation of said knob adjusts said focus adjustment means in a manner related to the distance between a viewer employing said binoculars and an object to be viewed, the improvement comprising first click-stop means operatively associated with said rotatable focusing knob, said click-stop means being effective to abruptly increase the force required to rotate said knob at a focus setting for a first predetermined distance between said object to be viewed and said viewer and wherein said focus adjustment means includes an outer eyepiece barrel and said click-stop means comprises a spring and a ball associated with said spring, said ball and spring being disposed within said rotatable focusing knob, said ball having a first diameter, said click-stop means further comprising a countersunk cylindrical recess in said outer eyepiece barrel, the cross-sectional diameter of said cylindrical recess being smaller than said first diameter.

* * * * *